United States Patent
Jo et al.

(10) Patent No.: US 12,288,864 B2
(45) Date of Patent: Apr. 29, 2025

(54) ELECTRODE ROLLING APPARATUS AND ELECTRODE ROLLING METHOD

(71) Applicant: LG Energy Solution, Ltd., Seoul (KR)

(72) Inventors: A Hae Jo, Daejeon (KR); Jee Eun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 238 days.

(21) Appl. No.: 17/795,124

(22) PCT Filed: Nov. 4, 2021

(86) PCT No.: PCT/KR2021/015933
§ 371 (c)(1),
(2) Date: Jul. 25, 2022

(87) PCT Pub. No.: WO2022/108202
PCT Pub. Date: May 27, 2022

(65) Prior Publication Data
US 2023/0041063 A1    Feb. 9, 2023

(30) Foreign Application Priority Data

Nov. 19, 2020   (KR) .................. 10-2020-0155837

(51) Int. Cl.
*H01M 4/04*   (2006.01)
*H01M 4/139*   (2010.01)

(52) U.S. Cl.
CPC ......... *H01M 4/0435* (2013.01); *H01M 4/139* (2013.01)

(58) Field of Classification Search
CPC ................. H01M 4/139; H01M 4/0435
See application file for complete search history.

(56) References Cited

U.S. PATENT DOCUMENTS

| | | | |
|---|---|---|---|
| 2008/0268334 A1 | 10/2008 | Ward et al. | |
| 2018/0034026 A1 | 2/2018 | Tanaka et al. | |
| 2020/0006731 A1* | 1/2020 | Tokuno | H01M 50/461 |

FOREIGN PATENT DOCUMENTS

| | | |
|---|---|---|
| CN | 205128595 U | 4/2016 |
| CN | 205810968 U | 12/2016 |
| CN | 110127406 A | 8/2019 |
| CN | 111554883 A | 8/2020 |
| CN | 111952536 A | 11/2020 |
| JP | H1050300 A | 2/1998 |
| JP | H11144717 A | 5/1999 |
| JP | H11329417 A | 11/1999 |
| JP | 2000353513 A * | 12/2000 |
| JP | 2001216959 A | 8/2001 |
| JP | 2002015719 A | 1/2002 |

(Continued)

OTHER PUBLICATIONS

Machine translation JP2001216959A (Year: 2001).*

(Continued)

*Primary Examiner* — Jacob T Minskey
*Assistant Examiner* — Wayne K. Swier
(74) *Attorney, Agent, or Firm* — Lerner David LLP

(57) ABSTRACT

The present invention relates to an electrode rolling apparatus and an electrode rolling method, and the apparatus includes: a pair of rolling rolls which roll an electrode; and an adhesive tape which is inserted into the rolling rolls together with the electrode and is rolled together with the electrode, and is then separated from the electrode.

11 Claims, 6 Drawing Sheets

(56) References Cited

FOREIGN PATENT DOCUMENTS

| | | | |
|---|---|---|---|
| JP | 2002151062 A | | 5/2002 |
| JP | 2005216723 A | | 8/2005 |
| JP | 2017004717 A | * | 1/2017 |
| JP | 2017183438 A | | 10/2017 |
| JP | 6408137 B2 | | 10/2018 |
| JP | 2019125499 A | | 7/2019 |
| JP | 2020004684 A | | 1/2020 |
| KR | 100280290 B1 | | 11/2001 |
| KR | 100377920 B1 | | 3/2003 |
| KR | 101154883 B1 | | 6/2012 |
| KR | 101402976 B1 | | 6/2014 |
| KR | 10-1713102 B1 | * | 3/2017 |
| KR | 10-1816765 B1 | * | 1/2018 ................ C08J 5/18 |
| KR | 20200089138 A | | 7/2020 |
| KR | 20200126767 A | | 11/2020 |

OTHER PUBLICATIONS

Machine translation KR101402976B1 (Year: 2014).*
Machine translation JP2019125499A (Year: 2019).*
Machine translation JP2000353513A (Year: 2000).*
Machine translation KR101713102B1 (Year: 2017).*
Machine translation JP2017004717A (Year: 2017).*
Machine translation KR101816765B1 (Year: 2018).*
International Search Report for Application No. PCT/KR2021/015933 mailed Mar. 2, 2022, pp. 1-3.

* cited by examiner

[FIG. 1]
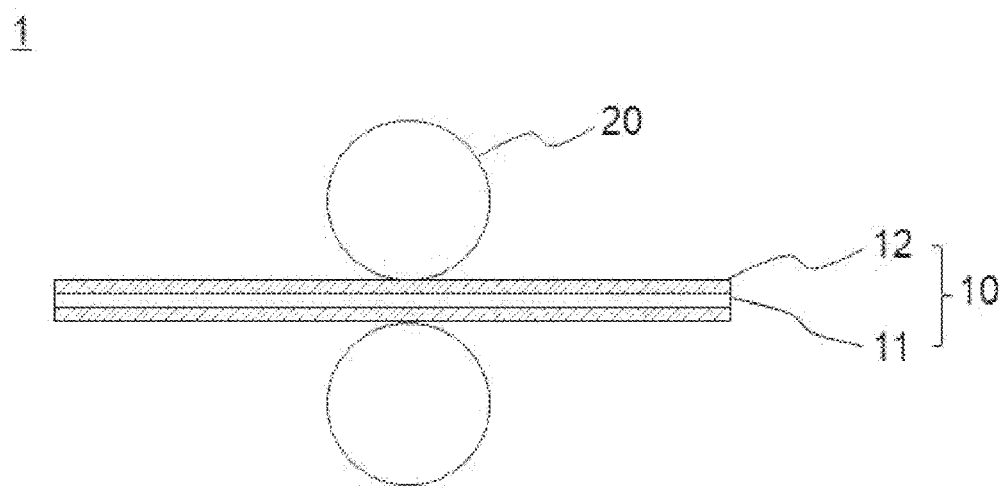

[FIG. 2]
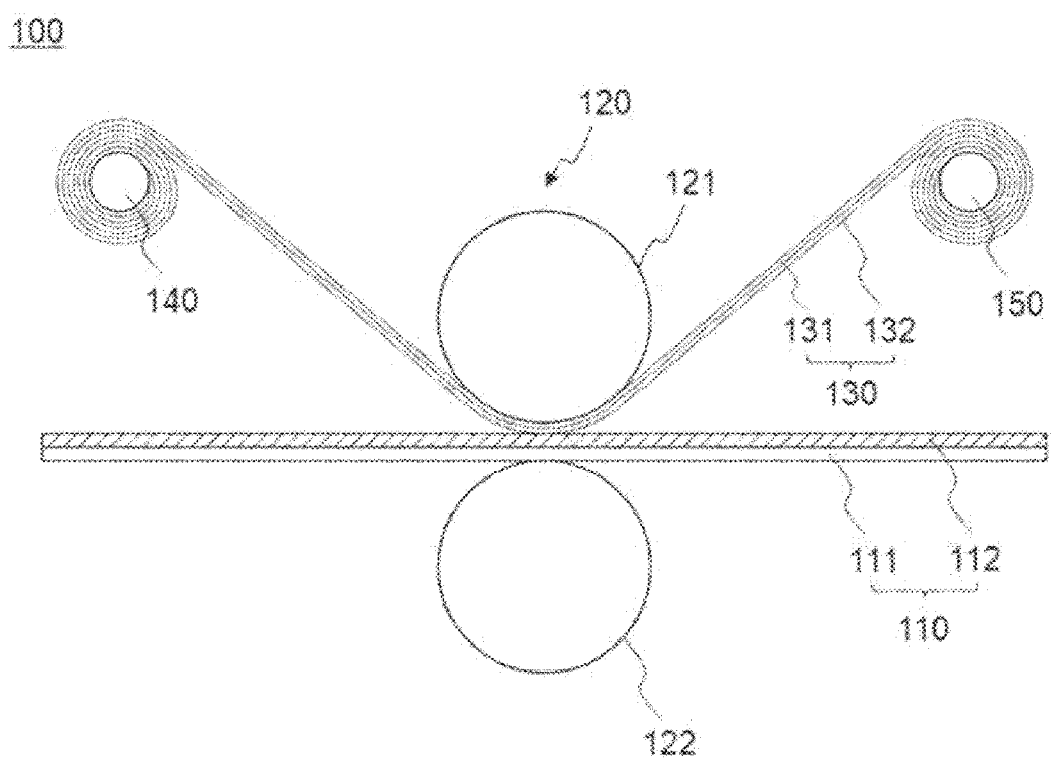

[FIG. 3]
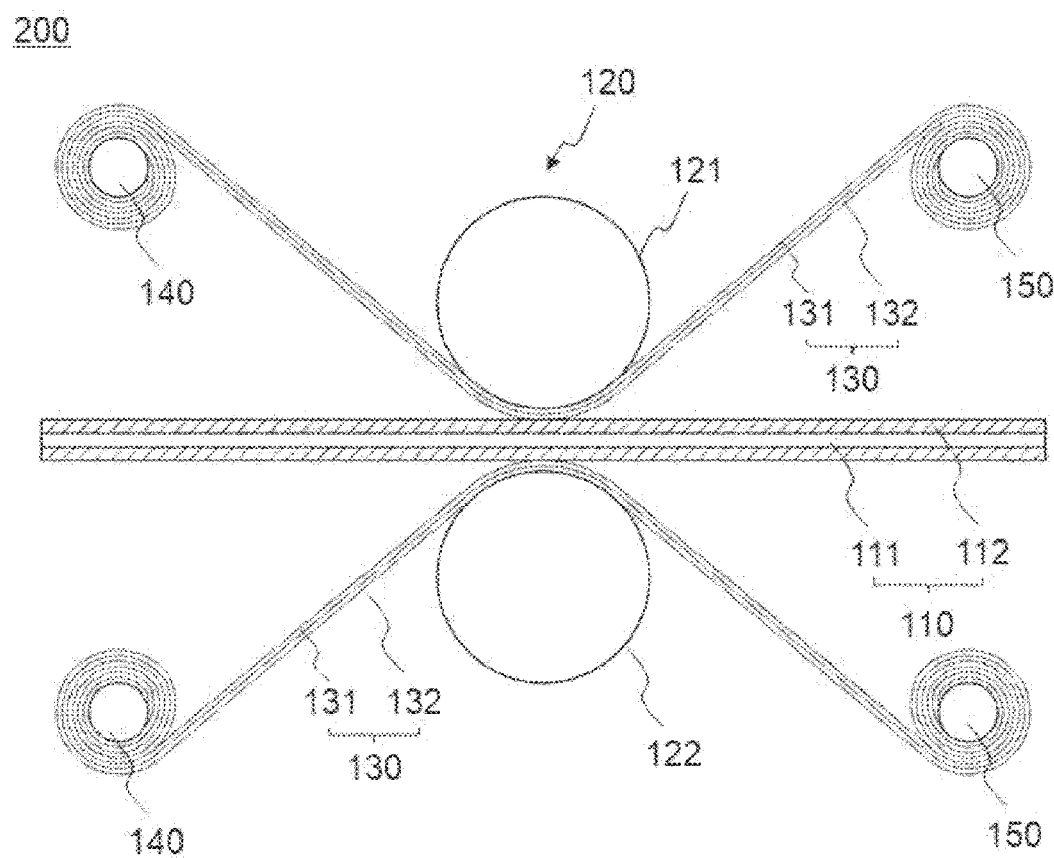

[FIG. 4]
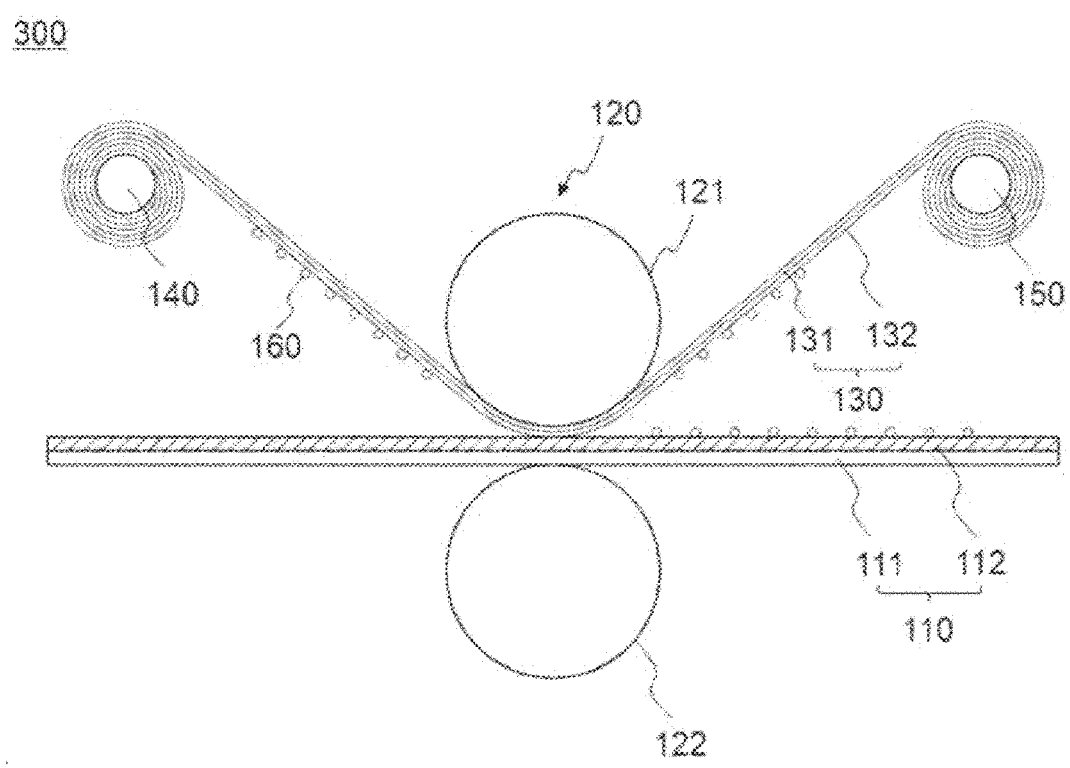

[FIG. 5]
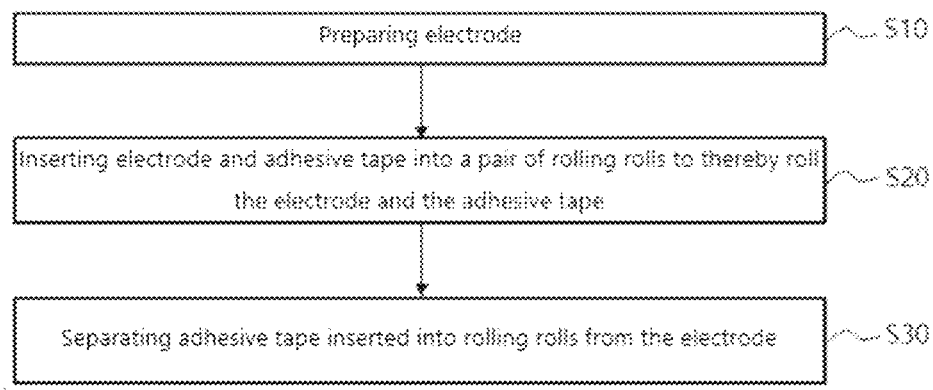

[FIG. 6]
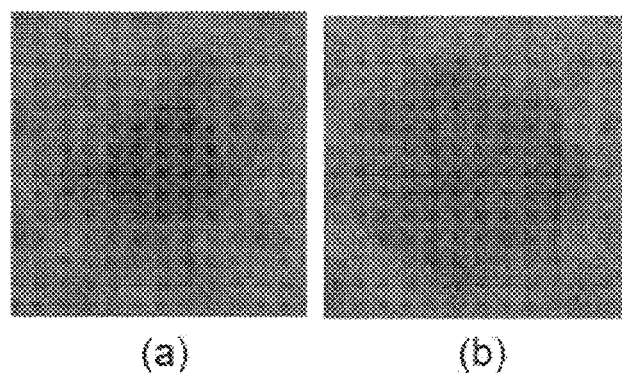
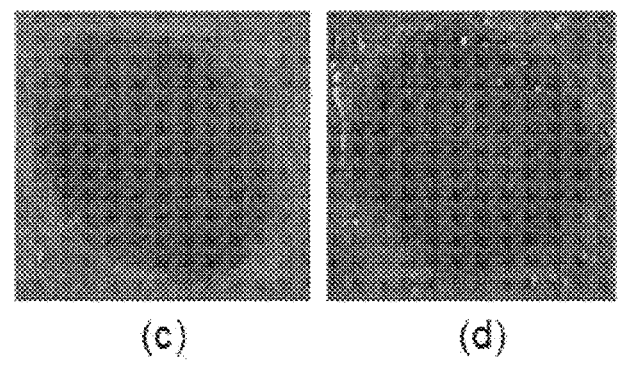

ELECTRODE ROLLING APPARATUS AND ELECTRODE ROLLING METHOD

CROSS-REFERENCE TO RELATED APPLICATIONS

The present application is a national phase entry under 35 U.S.C. § 371 of International Application No. PCT/KR2021/015933, filed on Nov. 4, 2021, which claims priority to Korean Patent Application No. 10-2020-0155837, filed on Nov. 19, 2020, the disclosures of which are incorporated herein by reference in their entirety.

TECHNICAL FIELD

The present disclosure relates to an electrode rolling apparatus and an electrode rolling method.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

Such an electrode may be manufactured by applying an electrode slurry containing an electrode active material and a solvent on a current collector to form an electrode active material layer, followed by drying and rolling.

FIG. 1 is a schematic diagram showing a general electrode rolling apparatus.

Referring to FIG. 1, an electrode rolling apparatus 1 includes a pair of rolling rolls 20. Further, the electrode 10 has a structure where an electrode active material layer 12 is formed on the current collector 11, and the electrode is inserted into a space between the rolling rolls 20 to thereby be rolled.

At this time, in order to enhance the energy density of the electrode while constantly maintaining the thickness of the electrode, the electrode should be compressed as much as possible after enhancing the loading amount of the electrode. However, in this case, as the particles constituting the electrode active material layer are aggregated by excessive compression, the surface of the electrode becomes smooth and hydrophobic, and as the number of pores, through which the electrolyte solution can permeate, on the surface of the electrode decreases, the impregnation property of the electrolyte solution decreases.

Likewise, if an electrolyte solution is not sufficiently impregnated in the electrode, a dead volume of the electrode is generated. In the case of the positive electrode, the deintercalation of lithium is not performed in the active material in the portion where the electrolyte solution is not impregnated, which causes charge imbalance of the electrode and a low voltage defect of the battery cell. In the case of the negative electrode, lithium precipitation is caused in a portion where the electrolyte solution is not impregnated, and the safety of the cell is degraded.

Further, when the electrode is rolled, electrode active materials, etc. may be attached on the surface of the rolling rolls, and the electrode active materials may later act as contaminants during the rolling process. As such, since a separate rolling roll cleaning process is necessary, the time that takes in cleaning and the worker's safety may become a problem.

DISCLOSURE

Technical Problem

The present technology is believed to solve at least some of the above problems. For example, an aspect of the present technology provides an electrode rolling apparatus and electrode rolling method capable of preventing reduction of impregnation property for an electrolyte solution of an electrode due to excessive compression of the electrode and preventing contamination of rolling rolls during the rolling process.

Technical Solution

An apparatus for rolling an electrode according to an embodiment of the present invention includes: a pair of rolling rolls which roll an electrode; and an adhesive tape which is inserted into the rolling rolls together with the electrode and is rolled together with the electrode, and is then separated from the electrode.

In a specific example, the adhesive tape may include a substrate and an adhesive layer formed on one surface of the substrate.

In a specific example, the adhesive layer may be formed on a surface where the substrate contacts the electrode.

In a specific example, the apparatus may further include: an unwinding roll from which the adhesive tape is unwound; and a rewinding roll which winds the adhesive tape inserted into the rolling rolls after separating the adhesive tape from the electrode.

In another example, the adhesive tape may further include a particulate material attached on a surface of an adhesive layer.

In a specific example, the particulate material may be an inorganic material containing $SiO_x$ ($0<x\leq2$).

Further, the present technology provides a method of rolling an electrode. The method includes: preparing an electrode; inserting the electrode and an adhesive tape into a pair of rolling rolls to thereby roll the electrode and the adhesive tape; and changing a surface state of an electrode active material layer by separating the adhesive tape inserted into the rolling rolls from the electrode.

In a specific example, the adhesive tape may include a substrate and an adhesive layer formed on one surface of the substrate.

In a specific example, the adhesive layer may be formed on a surface where the substrate contacts the electrode.

In a specific example, the adhesive tape may further include a particulate material attached on a surface of an adhesive layer.

In a specific example, the particulate material may be an inorganic material containing SiOx ($0<x \leq 2$).

At this time, the particulate material may be transferred onto a surface of the electrode as the adhesive tape and the electrode are rolled together.

Advantageous Effects

Further, according to the electrode rolling apparatus and method of the present technology, it is possible to improve the impregnation property for the electrolyte solution of the electrode by changing the surface state of the electrode having a structure where electrode active materials have been aggregated on the surface by rolling the inserted adhesive tape together with the electrode at the time of rolling the electrode.

Further, according to the electrode rolling apparatus and method of the present technology, contamination of the rolling rolls may be prevented by rolling the electrode and the adhesive tape together.

BRIEF DESCRIPTION OF THE DRAWINGS

FIG. 1 is a schematic diagram showing a general electrode rolling apparatus.

FIGS. 2 and 3 are schematic diagrams showing an electrode rolling apparatus according to an embodiment of the present invention.

FIG. 4 is a schematic diagram showing an electrode rolling apparatus according to another embodiment of the present invention.

FIG. 5 is a flowchart illustrating an order of an electrode rolling method according to the present technology.

FIG. 6 shows photographs of surfaces of electrodes according to examples and comparative examples after dropping an electrolyte solution.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top. Hereinafter, the present invention will be described in detail with reference to the drawings.

An apparatus for rolling an electrode according to an embodiment of the present technology may include: a pair of rolling rolls which roll an electrode; and an adhesive tape which is inserted into the rolling rolls together with the electrode and is rolled together with the electrode, and is then separated from the electrode.

As described above, in the conventional rolling device and method, in order to increase the energy density while maintaining the thickness of the electrode constant, the electrode should be compressed as much as possible after enhancing the loading amount of the electrode. In this case, as the particles constituting the electrode active material layer are aggregated by excessive compression, the surface of the electrode becomes smooth and hydrophobic, and as the number of pores, through which the electrolyte solution can permeate, on the surface of the electrode decreases, the impregnation property of the electrolyte solution decreases. Further, when the electrode is rolled, electrode active materials, etc. may be attached on the surface of the rolling rolls, and the electrode active materials may later act as contaminants during the rolling process.

Further, according to the electrode rolling apparatus and method of the present technology, it is possible to improve the impregnation property for the electrolyte solution of the electrode by changing the surface state of the electrode having a structure where electrode active materials have been aggregated on the surface by rolling the inserted adhesive tape together with the electrode at the time of rolling the electrode.

Further, according to the electrode rolling apparatus and method of the present technology, contamination of the rolling rolls may be prevented by rolling the electrode and the adhesive tape together.

Hereinafter, an electrode rolling apparatus and an electrode rolling method according to the present technology will be described in detail.

<Electrode Rolling Apparatus>

FIGS. 2 and 3 are schematic diagrams showing an electrode rolling apparatus according to an embodiment of the present invention.

Referring to FIGS. 2 and 3, an apparatus 100 for rolling an electrode according to the present technology includes: a pair of rolling rolls 120 which roll an electrode 110; and an adhesive tape 130 which is inserted into the rolling rolls 120 together with the electrode 110 and is rolled together with the electrode 110, and is then separated from the electrode 110.

The electrode 110 may have a structure where an electrode active material layer 112 is formed by applying an electrode slurry including an electrode active material on the current collector 111 and drying the electrode slurry.

The current collector 111 may be a positive electrode current collector or a negative electrode current collector, and the electrode active material may be a positive electrode active material or a negative electrode active material. In addition, the electrode slurry may further include a conductive material and a binder in addition to the electrode active material.

In the present technology, the positive electrode collector generally has a thickness of 3 to 500 μm. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 μm. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present technology, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}MaO_{(2-e)}$ Ae such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c < 0.8$, $0 \leq d < 0.2$, $0 \leq e \leq 0.2$, $b+c+d<1$, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$). But the present invention is not limited to these examples. Examples of the negative electrode active material include carbon such as non-graphitized carbon and graphite carbon; metal complex oxide such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, groups 1, 2, and 3 of the periodic table, halogen; $0 < x \leq 1$; $1 \leq y \leq 3$; $1 < z \leq 8$); lithium metal; lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30 wt % based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30 wt %, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

Meanwhile, such an electrode slurry may be prepared by dissolving an electrode active material, a conductive material, and a binder in a solvent. The type of the solvent is not particularly limited as long as it is capable of dispersing an electrode active material, and either an aqueous solvent or a non-aqueous solvent may be used. For example, the solvent may be a solvent generally used in the art, such as dimethyl sulfoxide (DMSO), isopropyl alcohol, N-methylpyrrolidone (NMP), acetone, or water, and one of them alone or a mixture of two or more may be used. The amount of the solvent used may be such that the slurry can be adjusted to have an appropriate viscosity in consideration of the coating thickness, production yield, and workability of the slurry, and is not particularly limited. The solvent may be removed in the drying process.

Further, the rolling rolls 120 are composed of a pair including an upper roll 121 positioned on the upper surface of the electrode 110 and a lower roll 122 positioned on the lower surface of the electrode 110 in order to roll the electrode 110. In the rolling apparatus according to the present technology, two or more pairs of rolling rolls 120 may be provided, and the number of the rolling rolls 120 may be appropriately designed by one of ordinary skill in the art. The electrode 110 may be inserted into a space between the upper roll 121 and the lower roll 122.

Further, the electrode rolling apparatus 100 according to the present technology further includes an adhesive tape 130. The adhesive tape 130 is inserted into the rolling rolls 120 together with the electrode 110 and is then rolled by the rolling rolls 120 together with the electrode 110. As the adhesive tape 130 is separated from the electrode 110 after rolled, the adhesive tape 130 can change the surface state of the electrode 110 by the rolling.

The adhesive tape 130 may include a substrate 131 and an adhesive layer 132 formed on one surface of the substrate 131. At this time, the type of the substrate 131 and the adhesive layer 132 constituting the adhesive tape 130 can be appropriately designed by one of ordinary skill in the art.

For example, the substrate 131 may include a film or foam made of a thermoplastic resin, but the present invention is not limited to this example.

The film made of a thermoplastic resin may contain at least one selected from the group consisting of urethane resin, acrylic resin, polyamide resin, polyester resin, polyether resin, polypropylene-polyethylene resin, polypropylene resin, polyethylene terephthalate resin, polybutylene terephthalate resin, polystyrene resin, acrylonitrile-styrene resin, acrylonitrile-butadiene-styrene resin, polyphenylene sulfide resin, nylon resin, polyether imide resin, and a combination thereof, and the present invention is not limited to these examples.

The thickness of the substrate 131 may be appropriately designed by one of ordinary skill in the art, and it is necessary to have a sufficient mechanical strength in order not to be damaged during the rolling and winding process while not interfering with the rolling process of the electrode. For example, the thickness of the substrate may be in the range of 10 to 150 μm, specifically in the range of 30 to 120 μm, and more specifically in the range of 50 to 100 μm. When the thickness of the substrate is in the above range, it is possible to implement sufficient mechanical strength while not interfering with the rolling process of the electrode.

Further, the adhesive layer 132 may be made of a polymer material constituting an adhesive layer used in a general adhesive tape. For example, the adhesive layer 132 may contain at least one selected from the group consisting of phenolic epoxy resin, polyimide resin, epoxy resin, acrylic resin, silicon resin, and polyurethane resin. More specifically, an acrylic resin or a polyurethane resin may be used as the adhesive layer. The composition of the adhesive layer may be appropriately designed by one of ordinary skill in the art in order to achieve the adhesive strength as follows.

The thickness of the adhesive layer 132 would have been appropriately designed by one of ordinary skill in the art. For example, the thickness may be in the range of 10 to 50 μm or 20 to 40 μm, but the present invention is not limited to these examples. Herein, if the adhesive layer is excessively thick, it is not desirable because the adhesive tape may remain on the surface of the electrode when the adhesive tape is separated from the electrode.

Further, the adhesive layer 132 is formed on the surface where the substrate 131 contacts the electrode 110. Namely, in the present technology, the adhesive tape 130 is attached on the electrode 110 by the adhesive layer 132 as the adhesive tape 130 is rolled together with the electrode 110, and part of the electrode active material on the surface is peeled off from the electrode 110 by the adhesive layer 132 as the adhesive tape 130 is separated from the electrode 110 after the rolling. Generally, the electrode comes to be in a state that the electrolyte solution cannot be easily permeated by the rolling, and as the adhesive tape 130 peels off the electrode active material on the surface, the electrolyte solution can be easily permeated onto the peeled portion. More specifically, the adhesive tape 130 may prevent the adhesive layer 132 on the adhesive tape 130 from remaining on the surface of the electrode by being separated from the electrode 110 right after the rolling.

Further, as the adhesive tape 130 is interposed between the electrode 110 and the rolling rolls 120, it is possible to prevent electrode active materials from being attached on the rolling rolls 120 and acting as contaminants. At this time, the adhesive layer 132 is formed on only the surface contacting the electrode 110, and the adhesive layer is not formed on the surface where the rolling rolls 120 contact the adhesive tape 130. Hence, it is possible to prevent the elements of the adhesive layer 132 from being attached on the rolling rolls 120.

The adhesive tape 130 preferably has an adhesive strength capable of detaching only electrode active materials on the surface of the electrode. Specifically, the adhesive strength of the adhesive tape may be in the range of 50 to 2000 gf/25 mm, and more specifically in the range of 70 to 1000 gf/25 mm. The adhesive strength may be measured, for example, based on ASTM-D903. If the adhesive strength of the adhesive tape is beyond the above range and is excessively small, it is difficult to achieve the purpose of the present technology because it is difficult detach active materials on the surface of the electrode, and if the adhesive strength is excessively large, the amount of peeled active materials excessively increases, thereby damaging the electrode and deteriorating the quality of the electrode. Further, when the adhesive strength is excessively large, it may be difficult for particulate materials to be described later to be transferred onto the surface of the electrode.

The adhesive tape 130 may be inserted into the rolling rolls 120 and moved at the same speed as the electrode 110 in order to be rolled together with the electrode 110. To this end, the apparatus 100 may further include: an unwinding roll 140 from which the adhesive tape 130 is unwound; and a rewinding roll 150 which winds the adhesive tape 130 inserted into the rolling rolls 120 after separating the adhesive tape 130 from the electrode 110.

The unwinding roll 140 is a roll on which an already prepared adhesive tape 130 has been wound, and the adhesive tape 130 may be unwound and be inserted together with the electrode 110 at the time of the rolling process. Further, the rewinding roll 150 separately retrieves and winds the adhesive tape 130, which is attached on the surface of the electrode 110 by the rolling, from the electrode 110. At this time, one side of the adhesive tape 130 may have been wound on the unwinding roll 140, and the other side may have been wound on the rewinding roll 150. In this state, if the electrode 110 is inserted, the adhesive tape 130 may be rolled together with the electrode 110 while moving at the same speed as that of the electrode 110 by the rotation of the unwinding roll 140 and the rewinding roll 150. The adhesive tape 130 rolled together with the electrode 110 may be automatically separated from the electrode 110 as wound on the rewinding roll 150.

At this time, the adhesive tape 130, the unwinding roll 140, and the rewinding roll 150 may be formed on one surface or both surfaces of the electrode 110. In the case of FIG. 2, the electrode rolling apparatus 100 is about a case in which the electrode active material layer 112 is formed on only one surface of the current collector 111, and the adhesive tape 130 is positioned on only one surface of the electrode 110. Further, in the case of FIG. 3, the electrode rolling apparatus 200 is about a case in which the electrode active material layer 112 is formed on both surfaces of the current collector 111, and the adhesive tape 130 may be positioned on both surfaces of the electrode 110.

FIG. 4 is a schematic diagram showing an electrode rolling apparatus according to another embodiment of the present invention.

Referring to FIG. 4, the electrode rolling apparatus 300 may include a rolling roll 120, an adhesive tape 130, an unwinding roll 140, and a rewinding roll 150 as described above. At this time, the adhesive tape 130 may further include a particulate material 160 attached on a surface of an adhesive layer 132. Herein, the particulate material 160 may be a material which is attached on the surface of the electrode 110 and is used to reform the electrode 110. The particulate material 160 is attached on the surface of the adhesive layer 132, and when rolled by the rolling rolls 120, the whole or part of the particulate material 160 may be transferred onto the surface of the electrode 110 or the surface of the electrode active material layer 112. Namely, according to the present technology, the particulate material can be simply coated on the surface without a separate coating process, and accordingly, the process efficiency can be improved. The particulate material may be applied on the surface of the adhesive layer in a manner that does not excessively decrease the adhesive force of the adhesive tape, which may be appropriately designed by one of ordinary skill in the art.

The particulate material 160 may be appropriately selected according to the performance of the electrode to be implemented or improved. In a specific example, inorganic particles may be used. The inorganic particle may be at least one selected from the group consisting of silicon oxide (SiOx, 0<x≤2), alumina ($Al_2O_3$), titanium dioxide ($TiO_2$), and tungsten oxide, and more preferably SiOx (0<x≤2) may be used. Such particulate materials can improve the wetting property and the impregnation property for the electrolyte solution of the electrode by acting as the core which holds the electrolyte solution on the surface of the electrode. The amount of the particulate material applied on the surface of the electrode may be adjusted through the amount of the particulate material attached on the surface of the adhesive layer. The amount of the particulate material applied on the surface of the electrode may be appropriately adjusted by one of ordinary skill in the art.

Further, the average particle diameter ($D_{50}$) of the particulate material 160 may be appropriately designed by one of ordinary skill in the art. For example, the average particle diameter may be in the range of 10 nm to 5 μm, specifically in the range of 10 nm to 3 μm, and more specifically in the range of 10 nm to 1 μm. The average particle diameter $D_{50}$ may be measured using, for example, a laser diffraction method. If the average particle diameter of the particulate material is excessively large, it may hinder permeation of the electrolyte solution and damage the separator facing the electrode mixture layer.

In addition, the present technology provides an electrode rolling method.

FIG. 5 is a flowchart illustrating an order of an electrode rolling method according to the present technology.

Referring to FIG. 5, a method of rolling an electrode according to the present technology includes: preparing an electrode (S10); inserting the electrode and an adhesive tape into a pair of rolling rolls to thereby roll the electrode and the adhesive tape (S20); and changing a surface state of an electrode active material layer by separating the adhesive tape inserted into the rolling rolls from the electrode (S30).

Further, according to the electrode rolling apparatus and method of the present technology, it is possible to improve the impregnation property for the electrolyte solution of the electrode by changing the surface state of the electrode having a structure where electrode active materials have been aggregated on the surface by rolling the inserted adhesive tape together with the electrode at the time of rolling the electrode.

Further, according to the electrode rolling apparatus and method of the present technology, contamination of the rolling rolls may be prevented by rolling the electrode and the adhesive tape together.

First, when preparing an electrode, an electrode active material layer can be formed as an electrode slurry containing an electrode active material is coated on at least one surface of the current collector and is dried. The details about this are as described above.

When an electrode is prepared, the electrode and an adhesive tape are inserted into a pair of rolling rolls to thereby roll the electrode. The adhesive tape includes a substrate and an adhesive layer formed on one surface of the substrate. The adhesive layer may be formed on a surface where the substrate contacts the electrode. The composition of the substrate and the adhesive layer is as described above.

Referring to FIG. 5 with FIG. 2 or FIG. 3, the adhesive layer is attached on the surface of the electrode, namely, the surface of the electrode active material layer, as the adhesive tape 130, which has been unwound from the unwinding roll 140, is inserted into a space between the rolling rolls. Thereafter, when the rolling is terminated, the adhesive tape is promptly separated from the electrode and is wound on the rewinding roll. At this time, the adhesive tape can be made to be promptly separated from the electrode after the rolling by allowing the adhesive tape to be moved in a state that the two sides of the adhesive tape have been wound on the unwinding roll and the rewinding roll before the electrode is inserted.

Likewise, part of the electrode active materials on the surface of the electrode active material layer may be detached by the adhesive tape by attaching and separating the adhesive tape at the time of the rolling, and through this, it is possible to change the surface of the electrode active material layer, which comes to have a hydrophobic property due to the rolling, to have a state in which the electrolyte solution can be better permeated.

The adhesive tape may further include a particulate material attached on a surface of an adhesive layer. The adhesive tape is wound on the unwinding roll in a state that the particulate material has been attached on the surface of the adhesive layer, and the adhesive tape may be inserted together with the electrode.

The particulate material may be appropriately selected according to the performance of the electrode to be implemented or improved. In a specific example, inorganic particles may be used. The inorganic particle may be at least one selected from the group consisting of silicon oxide (SiOx, 0<x≤2), alumina ($Al_2O_3$), titanium dioxide ($TiO_2$), and tungsten oxide, and more preferably SiOx (0<x≤2) may be used.

The particulate material is transferred onto a surface of the electrode as the adhesive tape and the electrode are rolled together. Such particulate materials can improve the wetting property and the impregnation property for the electrolyte solution of the electrode by acting as the core which holds the electrolyte solution on the surface of the electrode.

Further, the present technology provides a method of manufacturing a secondary battery including an electrode rolling method as described above.

The secondary battery has a form where an electrode assembly, which has a form that a separator is interposed between a positive electrode and a negative electrode, is accommodated in a battery case. The positive electrode has a structure that a positive electrode active material layer is formed as a positive electrode slurry containing a positive electrode active material is applied on a positive electrode current collector, and the positive electrode and the negative electrode may have been manufactured and rolled by the above-described method.

The separator is interposed between the positive electrode and the negative electrode, and an insulating thin film having high ion permeability and mechanical strength is used. The pore diameter of the separator is generally 0.01 to 10 μm, and the thickness is generally 5 to 300 μm. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

Further, the battery case is not particularly limited as long as it is used as an exterior material for packaging the battery, and a cylindrical, square, or pouch type may be used. When an electrode assembly is accommodated in a battery case, the electrolyte solution is injected and sealed. Thereafter, a final secondary battery is manufactured through the formation process. Details about the battery case and the electrolyte solution are known to those of ordinary skill in the art, and thus detailed description thereof will be omitted.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Preparation of Electrode>

Graphite of 88 wt % and SiO of 10 wt % as the negative electrode active material, single walled carbon nanotube (SWCNT) of 0.05 wt % as the conductive material, styrene butadiene rubber (SBR) of 1.0 wt % as the binder, and CMC of 0.97 wt % as the thickener were added to water to thereby manufacture a negative electrode slurry.

An electrode was manufactured by coating the negative electrode slurry on one surface of a copper current collector (thickness: 10 μm) and rolling the slurry-coated current collector and vacuum-drying the slurry-coated current collector at a vacuum oven at 120° C.

<Rolling of Electrode>

The electrode was inserted into the rolling rolls together with the adhesive tape to thereby roll the electrode. Specifically, OPP BOX tape (adhesive strength: 72 gf/25 mm) was used as the adhesive tape. As shown in FIG. 2, the adhesive tape is wound between the unwinding roll and the rewinding roll, and when the rolling is performed, the adhesive tape is unwound from the unwinding roll and is rolled together with the electrode as moved between the rolling rolls. The adhesive tape was separated from the electrode after the rolling process and was wound on the rewinding roll.

Example 2

The electrode was manufactured and was then rolled as in the example 1 except that N.4605 (adhesive strength: 922 gf/25 mm) of Nitto Denko Co., Ltd. was used as the adhesive tape.

Example 3

The electrode was manufactured and was then rolled as in the example 1 except that N.9070 (adhesive strength: 1727 gf/25 mm) of 3M company was used as the adhesive tape.

Comparative Example

The electrode was manufactured and was then rolled as in the example 1 except that the electrode was rolled by a conventional rolling method as in FIG. 1 without using the adhesive tape.

Experimental Example

The electrolyte solution impregnation property was evaluated for the electrode according to the examples 1 to 3 and the comparative example. Specific evaluation items are as follows.

PC impregnation time evaluation: 20 samples were prepared for each electrode manufactured according to each example and comparative example. After dropping 1 ml propylene carbonate (PC) as the electrolyte solution on the surface of each sample using a syringe, time until the solvent was absorbed in the electrode was measured. The measurement result was obtained by calculating the average for results of 20 samples. The results are shown in Table 1.

TABLE 1

| Evaluation item | Example 1 | Example 2 | Example 3 | Comparative example |
|---|---|---|---|---|
| PC impregnation time (sec) | 72 | 65 | 70 | 140 |

Electrolyte solution spreadability evaluation: 1 ml of 1M $LiPF_6$ carbonate-based solution as the electrolyte solution was dropped on the surface of each electrode, and the spreadability of the electrolyte solution on the surface of the electrode was then observed. The result was shown in FIG. 6. FIG. 6(*a*) is a photograph obtained by photographing the surface of an electrode according to a comparative example, FIGS. 6(*b*) to 6(*d*) shows photographs obtained by photographing the surface of an electrode according to examples 1 to 3.

Referring to Table 1, in the case of the electrode according to examples 1 to 3, the impregnation time of the electrolyte solution more decreased, compared to the comparative example. This means that part of the tightly aggregated electrode active material has been peeled off by contacting the adhesive tape at the time of rolling the electrode and separating the adhesive tape after the rolling, and accordingly the surface state of the electrode has been changed and the impregnation property has been improved.

Further, in the case of FIG. 6, it is seen that the electrolyte solution is more spread out in the electrode according to the examples than in the comparative example at the time of injecting the electrolyte solution. Namely, it is seen that the electrode according to the example has more improved in the impregnation property than in the comparative example.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS 1, 100: electrode rolling apparatus
10, 110: electrode
11, 111: current collector
12, 112: electrode active material layer
20, 120: rolling roll
121: upper roll
122: lower roll
130: adhesive tape
131: substrate
132: adhesive layer
140: unwinding roll
150: rewinding roll

The invention claimed is:

1. An apparatus for rolling an electrode, the apparatus comprising:
a pair of rolling rolls configured to roll an electrode; and
an adhesive tape which is inserted into the rolling rolls together with the electrode and is rolled together with the electrode, and is then separated from the electrode,
wherein the adhesive tape further includes a particulate material attached on a surface of an adhesive layer,
wherein at least a portion of the particulate material is transferred onto a surface of the electrode such that the at least the portion of the particulate material remains on the surface of the electrode after the adhesive tape is separated from the electrode.

2. The apparatus of claim 1, wherein the adhesive tape includes a substrate and the adhesive layer formed on one surface of the substrate.

3. The apparatus of claim 2, wherein the adhesive layer is formed on a surface where the substrate contacts the electrode.

4. The apparatus of claim 1, further comprising:
an unwinding roll from which the adhesive tape can be unwound; and
a rewinding roll which is configured to wind the adhesive tape inserted into the rolling rolls after the adhesive tape is separated from the electrode.

5. The apparatus of claim 1, wherein the particulate material is an inorganic material containing SiOx, and wherein $0<x\leq2$.

6. A method of rolling the electrode using the apparatus of claim 1, the method comprising:
preparing the electrode;
inserting the electrode and the adhesive tape into the pair of rolling rolls to thereby roll the electrode and the adhesive tape; and
changing a surface state of an electrode active material layer by separating the adhesive tape inserted into the rolling rolls from the electrode.

7. The method of claim 6, wherein the adhesive tape includes a substrate and the adhesive layer formed on one surface of the substrate.

8. The method of claim 6, wherein the adhesive layer is formed on a surface where the substrate contacts the electrode.

9. The method of claim 6, wherein the particulate material is an inorganic material containing SiOx, and wherein $0<x\leq2$.

10. The method of claim 9, wherein the particulate material is transferred onto the surface of the electrode as the adhesive tape and the electrode are rolled together.

11. The apparatus of claim 1 wherein the adhesive tape, having the adhesive layer, is separated from the electrode right after the rolling, so as to prevent the adhesive layer from remaining on the surface of the electrode.

* * * * *